United States Patent [19]
Buchser et al.

[11] Patent Number: 5,033,273
[45] Date of Patent: Jul. 23, 1991

[54] ICE DISPENSER CONTROL APPARATUS

[75] Inventors: William J. Buchser, Evansville, Ind.; Charles C. Burger, Stevensville, Mich.

[73] Assignee: Whirlpool Corporation, Benton Harbor, Mich.

[21] Appl. No.: 522,921

[22] Filed: May 14, 1990

[51] Int. Cl.⁵ .............................. F25C 5/18
[52] U.S. Cl. ........................ 62/344; 200/332.1; 222/146.6
[58] Field of Search ............. 62/320, 344, 264; 222/146.6; 200/547, 551, 573, 574, 330, 333, 332.1, 331

[56] References Cited

U.S. PATENT DOCUMENTS

| | | | |
|---|---|---|---|
| 1,181,331 | 5/1916 | Metzger | 312/139.2 |
| 1,881,268 | 10/1932 | Edwards et al. | 49/416 |
| 2,668,456 | 2/1954 | Meistrell | 200/331 X |
| 3,572,053 | 3/1971 | Jacobus et al. | 62/344 |
| 3,602,007 | 8/1971 | Driecl | 62/344 |
| 3,602,441 | 8/1971 | Alvarez | 62/320 X |
| 3,640,088 | 2/1972 | Jacobus et al. | 62/320 |
| 3,747,363 | 7/1973 | Grimm | 62/377 |
| 3,824,805 | 7/1974 | Prada | 62/320 |
| 3,829,644 | 8/1974 | Annittoni | 200/332.1 |
| 3,918,266 | 11/1975 | Gindy et al. | 62/137 |
| 4,208,755 | 6/1980 | Shepherd | 15/160 |
| 4,209,999 | 7/1980 | Falk et al. | 62/344 |
| 4,295,026 | 10/1981 | Williams et al. | 200/331 |
| 4,449,015 | 5/1984 | Hotchkiss et al. | 174/138 F |
| 4,914,265 | 4/1990 | Mongeau | 200/330 |

Primary Examiner—William E. Tapolcai
Attorney, Agent, or Firm—Wood, Phillips, Mason, Recktenwald & Vansanten

[57] ABSTRACT

An ice dispenser switch actuator includes three parts—a rectangular base or frame, and two movable slides. Each slide is provided with a finger knob for moving the respective slide longitudinally within the frame to actuate respective switches, one to energize a light, and one to energize a solenoid. The slides are individually molded with runners on each of the four corners to fit into slide tracks formed in the top and bottom of the base. The slides also include tangs formed between the runners at the top and bottom to provide a more snug fit between the slides and the tracks of the base or frame. The slides are snapped into place within the frame with the runner slidably mounted in the tracks.

15 Claims, 4 Drawing Sheets

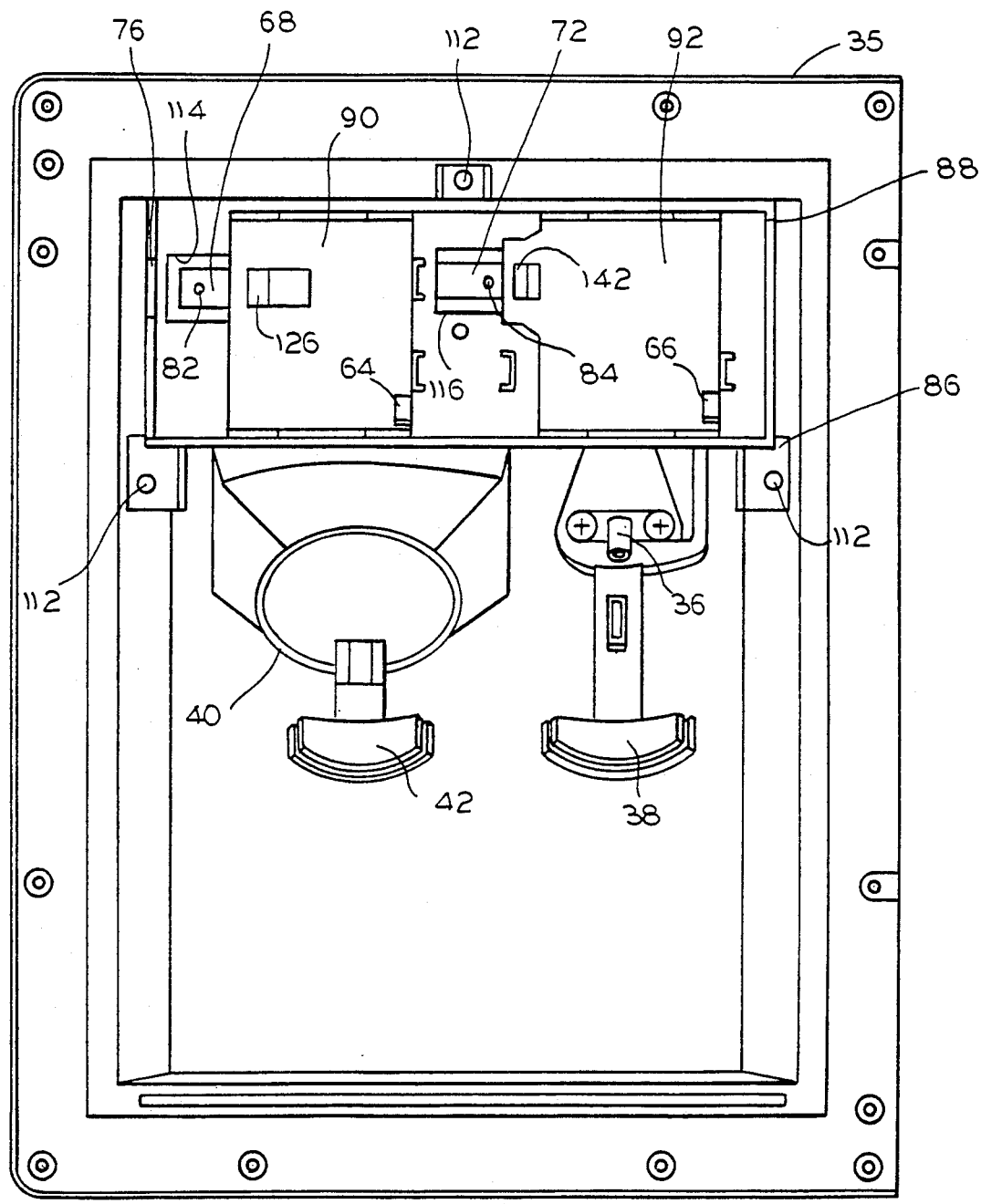
FIG.3
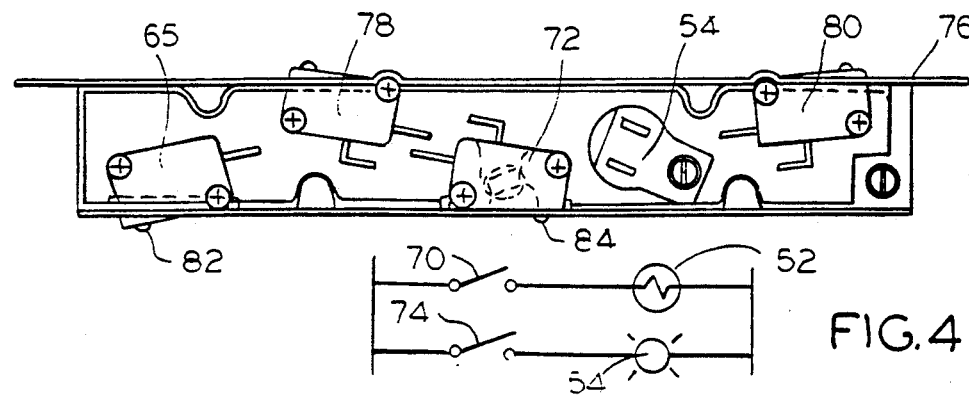
FIG.4
FIG.4A

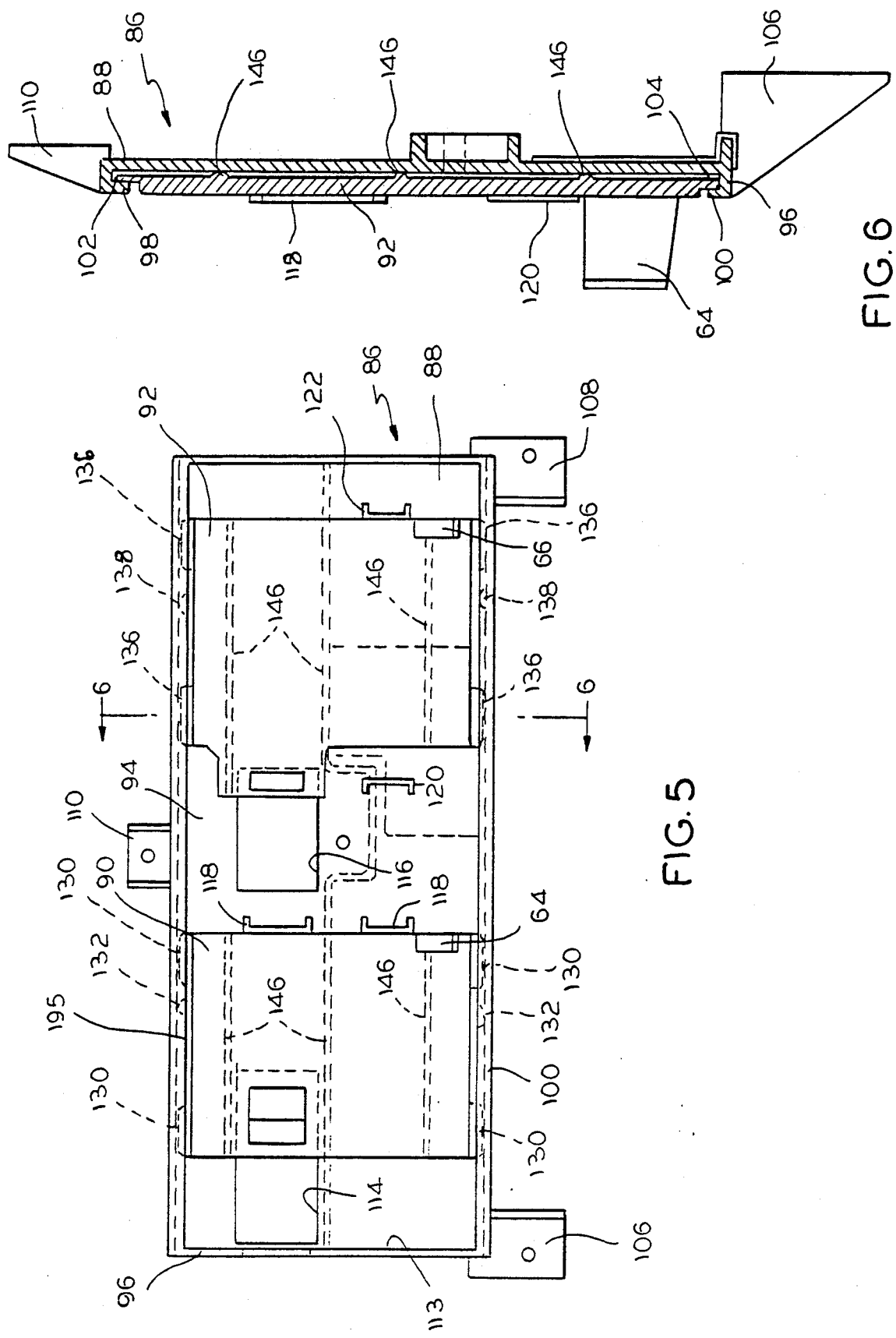

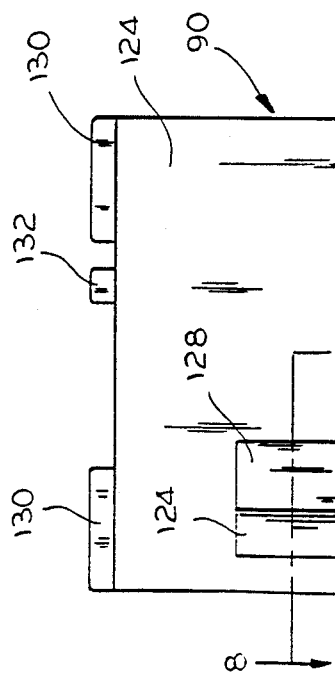
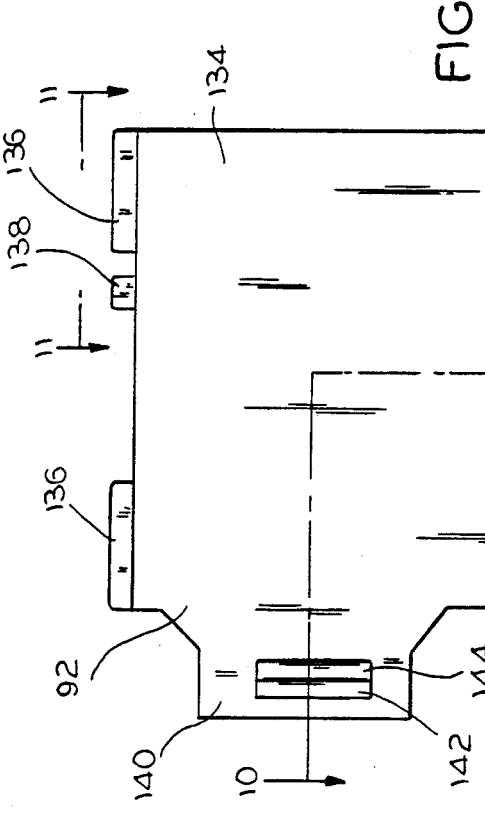
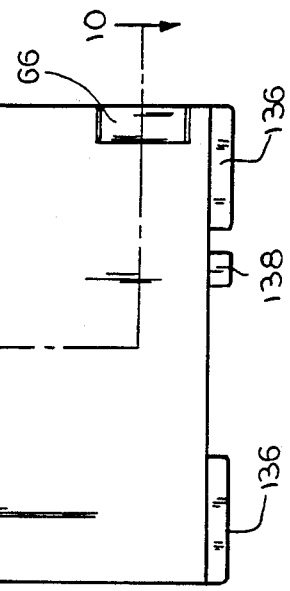
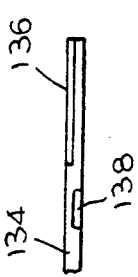

ICE DISPENSER CONTROL APPARATUS

FIELD OF THE INVENTION

This invention relates to an ice dispensing apparatus and, more particularly, to an improved control apparatus therefor.

BACKGROUND OF THE INVENTION

In one form of an ice making apparatus, an automatic apparatus is provided for forming ice cubes and periodically delivering the formed ice cubes into a subjacent container maintained within a freezer space of a refrigeration apparatus cabinet. In one conventional form, the ice cubes are removed from the container by a user grasping the ice cubes through an open top of the container and removing the desired quantity.

In another form of a refrigeration apparatus, a through-the-door ice dispenser is provided for automatically delivering a desired quantity of formed ice cubes from the container into a suitable receptacle, such as a glass or pitcher. Such an apparatus includes a conveying means for conveying ice cubes stored in the container to a discharge chute in the door. One example of such an automatic ice body dispenser is shown in Bushser U.S. patent application Ser. No. 459,651, filed Jan. 2, 1990, which is owned by the assignee of the present invention. As disclosed therein, the ice cubes are delivered from the container to a transfer mechanism by means of an auger which is rotated by a motor at the rear end of the auger. The forward end of the auger is connected to the transfer mechanism which transfers the ice bodies seriatim to a subjacent transfer chute leading to the dispensing area.

Associated with such a transfer mechanism is an ice crusher comprising a plurality of blades rotational with the auger and a solenoid actuated shutter. When the solenoid is energized the shutter is opened and the ice cubes are transferred via the transfer mechanism directly to the chute. When the solenoid is deenergized, causing the shutter to remain closed, the ice cubes are maintained in the transfer mechanism and are crushed by the blades to deliver crushed ice through the chute.

In order to provide suitable selection between ice cubes and crushed ice, it is necessary to utilize a selector mechanism for controlling actuation of the solenoid. Further, with an ice dispenser including a "night light", for illuminating a dispenser housing at night time, a similar switch must be provided. In selecting such switches, it is necessary to consider both the operation of such switches from a user standpoint, as well as the effect of such switches on the aesthetic appearance of the refrigeration apparatus. Also, it is desirable that any such switches be provided with a positive feel so that the perceived quality of the ice dispenser is of the highest regard.

The present invention is directed to overcoming one or more of the problems as set forth above.

SUMMARY OF THE INVENTION

There is disclosed herein an ice cube/crushed ice selecting apparatus which provides for remote control of a selector switch.

Broadly, there is disclosed herein an ice cube/crushed ice selecting apparatus in a refrigeration apparatus including a cabinet housing a storage space, a door for selectively closing the space, an ice making apparatus in the space and a through-the-door ice dispenser for delivering ice from the ice making apparatus. The ice selecting apparatus includes electrically operable means associated with the ice dispenser for selectively operating the ice dispenser to deliver either ice cubes or crushed ice. A selector switch includes an electrical contact connected to the electrically operable means for selecting ice cubes or crushed ice. A switch actuator is movable mounted relative to the ice dispenser for actuating the selector switch and including user engageable means remotely located relative to the selector switch for moving the actuator to actuate the selector switch to select ice cubes or crushed ice.

It is a feature of the invention that the switch actuator comprises a frame and a movable slide movably mounted to the frame.

It is another feature of the invention that the frame includes a channel receiving runners extending outwardly from the slide.

It is a further feature of the invention that the slide comprises a generally flat plate including a pair of planar runners at a top and bottom thereof receivable in top and bottom tracks in the frame.

It is still a further feature of the invention that the slide further comprises a tang at each of the top and the bottom of the plate and receivable in the tracks from providing a snug fit between the slide and the track.

It is still another feature of the invention that the tangs and the runners are of a thickness less than a thickness of the plate and the tangs and runners are in different planes.

It is still yet a further feature of the invention wherein the different planes are parallel to one another with the tangs and the runners partially overlapping.

It is an additional feature of the invention that the switch actuator is of molded plastic construction.

It is yet another feature of the invention that the switch actuator is molded with a lubricant to facilitate movement.

In accordance with a further aspect of the invention there is disclosed herein an ice dispenser selecting apparatus for a refrigeration apparatus including a cabinet providing a storage space, a door for selectively closing the space, an ice maker in the space and a through-the-door ice dispenser in a dispenser housing for delivering ice from the ice making apparatus and including a housing light. The selecting apparatus includes electrically operable means associated with the ice dispenser for selectively operating the ice dispenser to deliver either ice cubes or crushed ice. A first selector switch is provided in the housing including an electrical contact connected to the electrically operable means for selecting ice cubes or crushed ice. A second selector switch in the housing includes an electrical contact connected to the light for selecting operation of the same. A switch actuator includes a base mounted in the housing adjacent the switches and a pair of slides movably mounted relative to the base for actuating one of the selector switches and including user engageable means remotely located relative to its associated selector switch for moving the slide to actuate the selector switch.

It is a feature of the invention that the base includes means for limiting movement of each of the slides.

It is another feature of the invention that the limiting means limits movement of each slide by a different amount.

More specifically, the switch actuator has three parts, a rectangular base or frame, and two movable slides.

Each slide is provided with a finger knob for moving the respective slide longitudinally within the frame to actuate the respective switches, one to energize a light, and one to energize a solenoid.

The slides are individually molded with runners on each of the four corners to fit into slide tracks formed in the top and bottom of the base. The slides also include tangs formed between the runners at the top and bottom to provide a more snug fit between the slides and the tracks of the base or frame. The slides are snapped into place within the frame with the runner slidably mounted in the tracks.

Further features and advantages of the invention will readily be apparent from the specification and from the drawings.

BRIEF DESCRIPTION OF THE DRAWINGS

FIG. 3 is a front elevation view of a through-the-door ice dispenser housing of FIG. 1 with a cover plate removed;

FIG. 4 is a plan view illustrating a switch mounting assembly of the ice dispenser of FIG. 3;

FIG. 5 is a front elevation view of a switch actuator according to the invention;

FIG. 6 is a sectional view taken along the line 6—6 of FIG. 5;

FIG. 7 is a front elevation view of a first slide of the switch actuator of FIG. 5;

FIG. 8 is a sectional view taken along the line 8—8 of FIG. 7;

FIG. 9 is a front elevation view of a second slide of the switch actuator of FIG. 5;

FIG. 10 is a sectional view taken along the line 10—10 of FIG. 9; and

FIG. 11 is a detailed view taken along the line 11—11 of FIG. 9.

DETAILED DESCRIPTION OF THE INVENTION

Figures 1, 2:
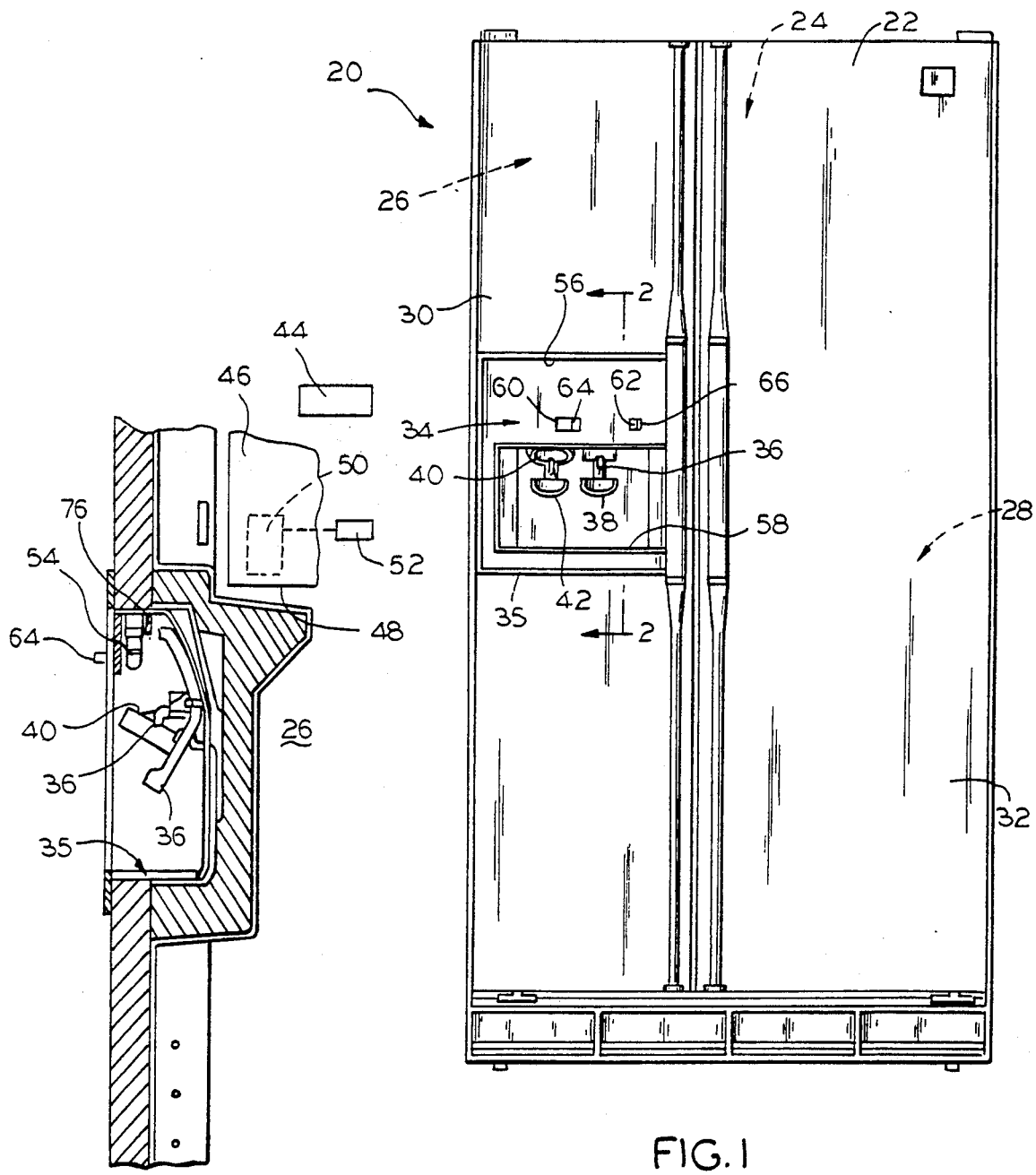
FIG. 1 is a front elevation view of a refrigeration apparatus including an ice dispenser selecting apparatus according to the invention.
FIG. 2 is a selectional view taken along the line 2—2 of FIG. 1.

With reference to FIG. 1, a refrigeration apparatus 20, comprising a side-by-side refrigerator/freezer, includes a cabinet 22 having a storage space 24. Particularly, the storage space 24 comprises a below-freezing, or freezer, compartment 26, and an above-freezing, or fresh food, refrigerated compartment 28. Access to the compartments 26 and 28 is had through respective freezer and refrigerator doors 30 and 32 hingedly mounted to the cabinets 22, as is well known.

The freezer door 30 is provided with a through-the-door ice and water dispenser 34. The dispenser 34 is contained within a housing 35 suitably mounted in the freezer door 30. The dispenser 34 includes a water spigot 36 through which water is automatically transferred to any receptacle position therebelow actuating a water dispenser lever 38, and an ice chute 40 through which ice may be automatically transferred upon actuation of an ice dispenser lever 42. In the illustrated embodiment, the ice may be fully formed ice cubes or crushed ice. Although the term ice cubes is used herein, such term is meant to indicate any fully formed ice body which may be in cube form, or other shape, such as semi-hemispherical, and is merely intended to distinguish from crushed ice, as is well known.

With reference to FIG. 2, the freezer compartment 26 houses a conventional ice making apparatus, illustrated schematically at 44, which delivers formed ice cubes into a subjacent ice container assembly 46. The ice container assembly 46 may be in the form disclosed in Buchser U.S. Pat. application Ser. No. 459,651, filed Jan. 2, 1990, owner by the assignee hereof, the specification of which is hereby incorporated by reference herein. As disclosed therein, the ice container assembly transfers ice bodies from the ice container assembly 46 to a dispensing space 48 located immediately above the ice chute 40. The ice container assembly 46 includes a shutter, illustrated schematically at 50, operable by means of a solenoid 52 for selecting delivery of ice cubes or crushed ice. Specifically, when the shutter is energized to be in its open position, the ice container assembly 46 delivers fully formed ice cubes to the dispensing space 48. Upon actuation of the solenoid 52, the shutter 50 is moved to a closed position causing ice cubes delivered from the ice container assembly 46 to be crushed by suitable blades, as disclosed in the co-pending application incorporated by reference herein, for delivering crushed ice to the dispensing space 48.

The dispenser housing 35 is provided with a night light 54 for suitably illuminating the dispensing apparatus if the area is dark, such as at night.

In order to control operation of the solenoid 52 and the night light 54, the dispenser housing 35 includes a cover plate 56 having an enlarged opening 58 for providing access to the ice chute 40 and the water spigot 36. The cover plate, above the opening 58, includes first and second smaller rectangular opening 60 and 62. Extending outwardly from each opening 60 and 62 is a user engageable knob 64 and 66, respectively. The knobs 64 and 66 are used for controlling operation of the solenoid 52 and light 54, as discussed in greater detail below.

With particular reference to FIG. 3, the ice dispenser housing 35 is illustrated with the cover plate 56 removed. With reference also to FIG. 4, a first switch 68 includes an electrical contact 70, see FIG. 4(a), electrically connected to the solenoid 52. A second switch 72 includes an electrical contact 74, see FIG. 4(a), electrically connected to the night light 54. The switches 68 and 72, and the light 54 are mounted in a bracket 76 mounted in the housing 35. The bracket 76 also includes third and fourth switches 78 and 80 actuated by the ice dispenser lever 42 and the water dispenser lever 38, respectively.

Each of the switches 68 and 72 is a sub-miniature switch including a respective operator 82 and 84 for moving the associated contacts 70 and 74 between the normally opened and closed positions.

A switch actuator 86, shown in detail in FIG. 5, is mounted to the housing 35 for actuating the switches 68 and 72. The switch actuator 86 includes a base or frame 88 and two movable slides 90 and 92, each provided with the respective finger knobs 64 and 66, discussed above, relative to FIG. 1. The knobs 64 and 66 are used for moving the respective slides 90 and 92 to the left or right relative to the frame 88. Particularly the first slide 90 is used for controlling the first switch 68, and the second slide 92 is used for controlling the second switch 72.

In the illustrated embodiment, the frame 88 and the slides 90 and 92 are both formed of molded plastic construction. The materials should be selected to provide dimensional stability and flexibility for use and installation. A suitable material is a plastic including a fiber glass filling and silicone for lubricity. One such acceptable material is acrylonitrite butadiene styrene (ABS) combined with fiberfill plastilube silicone in a ratio of 90 parts ABS to 10 part silicone/ABS concentrate.

The frame 88 comprises a molded plate 94 provided with a forwardly turned peripheral edge 96 around its perimeter. The top and bottom edges are further turned downwardly as at 98 and 100, respectively to define an upper track 102 and a lower track 104. The tracks 102 and 104 are used for slidably receiving the slides 90 and 92, as discussed below. Also integrally molded with the frame 88 are a pair of opposite bottom tabs 106 and 108 and a top tab 110 for mounting the frame 88 to the housing 35 using screws 112, see FIG. 3. Adjacent the left most end wall 113 of the plate 94 is a first rectangular opening 114. A similar rectangular opening 116 is provided generally centrally located in the plate 94, in a top half thereof. Particularly, the openings 114 and 116 positioned to be in alignment with the switches 68 and 72, respectively, incident to mounting the frame 88 in the housing 35, as shown in FIG. 3. A pair of stops 118 extend outwardly from the plate 94 for limiting travel of the first slide 90 between the end wall 113 and the stops 118. Additional stops 120 and 122 located below, and to the right of the second opening 116 are provided to limit movement of the second slide 92. As is illustrated, the stops allow for greater slidable movement of the first plate 90 than the second plate 92.

With reference to FIGS. 7 and 8, the first slide 90 comprises a rectangular-shaped plate 124 including the knob 64 integrally molded therein. In the upper left quadrant of the plate 124 is provided a rearwardly extending ramp portion 126 terminating in a plateau portion 128. At each of the four corners of the plate 124 is a runner 130 flush with the rear surface of the plate 124 and having a thickness less than a thickness of the plate 124. Disposed between the runners 130 at the top and the bottom is a tang 132 which is generally flush with a front surface of the plate 124 and of a thickness less than the thickness of the plate 124.

The second slide 92 is generally similar to the first slide 90 and includes a plate 134 of generally rectangular shape and having runners 136 at each of its four corners, and tangs 138 between each pair of runners 136 at the top and bottom. The runners 136 and tangs 138 are similar in configuration to those in the first slide 90. The second slide 92 differs in that no ramp portion is provided in the main portion of the plate 34. Instead, a protruding section 140 extends sidewardly from the plate 134 and includes a rearwardly extending ramp portion 142 terminating in a plateau portion 144, as is particularly illustrated in FIG. 10.

With reference also to FIG. 11, the runners 136 are of a relative narrow thickness to provide flexibility for mounting the slide 92 in the frame 88. The tangs 138 and the runners 136 are in different, parallel planes but overlap slightly in viewing the slide 92 from front to rear since the runners 136 and tangs 138 must be of sufficient thickness to provide strength and durability. Although not shown, a similar relationship exists relative to the runners 130 and tangs 132 of the first slide 90.

With reference also to FIGS. 5 and 6, the first slide 90 is mounted to the frame 88 by flexing the slide 90 and inserting it so that its runners 130 and tangs 132 are received in the upper and lower tracks 102 and 104, respectively. Similarly, the second slide 92 is mounted with its runners 136 and tangs 138 also received in the tracks 102 and 104. The runners 130 and 136 act as load bearing runners for the respective slides 90 and 92. The tangs 132 and 138 provide a light force inside the tracks 102 and 104 to cause the slides 90 and 92 to be held at the back surface of the tracks 102 and 104 which causes the slides 90 and 92 to be snug. As a result, the slides 90 and 92 are not prone to rattling as well as always assuring proper contact between the slides 90 and 92 and their associated switches 68 and 72.

To facilitate sliding movement, each of the slides 90 and 92 is provided with rearwardly extending ridges 146 to facilitate sliding movement of the slides 90 and 92 relative to the base plate 94.

With the switch actuator 86 installed, as illustrated in FIG. 3, movement of the first slide 90 from the right to the left causes the rearwardly extending ramp portion 126 to engage the operator 82 to actuate the first switch 68. This results in the contact 70 closing to energize the solenoid 52 when the ice lever is depressed, see FIG. 4(a), resulting in cubed ice being dispensed upon actuation of the ice dispenser lever 42. Returning the first slide 90 to the right most position illustrated in FIG. 3, results in the operator 82 being released by the ramp portion 126 and ice being delivered in crushed form.

Operation of the second slide 92 is similar. Particularly, when a user grasps the knob 66 and moves it towards the left, as illustrated in FIG. 3, the rearwardly extending ramp portion 142 engages the second switch operator 84 to cause its contact 74 to close, thus illuminating the light 54. Returning the second slide 92 to the illustrated position results in the light 54 being turned off. As illustrated, the second slide ramp portion 142 is positioned outwardly of the main body of the second slide 92 to act in conjunction with the stops 120 and 122 to provide for relative limited movement of the second slide 92 to energize the light 54. Conversely, the first slide 90 is allowed to traverse a greater longitudinal path relative to the frame 88. This is done to provide a relatively short stroke for operating the light, but providing a longer stroke for selecting between ice cubes and crushed ice, to satisfy consumer preference in making such selections.

Thus, in accordance with the invention, a switch actuator 86 is provided including a frame 88 and first and second slides 90 and 92. The slides 90 and 92 are provided with user engageable knobs 64 and 66, respectively, remotely located relative to switches 68 and 72, to be actuated by the slides 90 and 92, respectively. Moreover, the slides 90 and 92 are movably mounted to the frame 88 using a combination of tangs and runners 130 and 132, and 136 and 138 to provide smooth yet firm sliding movement of the slides 90 and 92. As a result, the refrigeration apparatus 20 is provide with a control apparatus which provides positive feel in selecting desired operation, while also providing an aesthetically appealing appearance.

The embodiment of the invention as disclosed herein is illustrative of the broad concepts comprehended hereby.

We claim:

1. In a refrigeration apparatus including a cabinet having a storage space, a door for selectively closing said space, an ice making apparatus in said space and a through-the-door ice dispenser for delivering ice from said ice making apparatus, an ice cube/crushed ice selecting apparatus comprising:

electrically operable means associated with said ice dispenser for selectively operating said ice dispenser to deliver either ice cubes or crushed ice;

a selector switch including an electrical contact connected to said electrically operable means for selecting ice cubes or crushed ice; and a switch actuator movably mounted relative to said ice dispenser for actuating said selector switch and including user engageable means remotely located relative to said selector switch for moving said actuator to actuate said selector switch to select ice cubes or crushed ice, wherein said switch actuator comprises a frame and a movable slide movably mounted to said frame, and said frame includes a channel receiving runners extending outwardly from said slide.

2. The ice cube/crushed ice selecting apparatus of claim 1 wherein said slide comprises a generally flat plate including a pair of planar runners at a top and bottom thereof receivable in top and bottom tracks in said frame.

3. The ice cube/crushed ice selecting apparatus of claim 2 wherein said slide further comprises a tang at each of the top and the bottom of said plate and receivable in said tracks for providing a snug fit between said slide and said tracks.

4. The ice cube/crushed ice selecting apparatus of claim 3 wherein said tangs and said runners are of a thickness less than a thickness of said plate and said tangs and said runners are in different planes.

5. The ice cube/crushed ice selecting apparatus of claim 4 wherein said different planes are parallel to one another with said tangs and said runners partially overlapping.

6. In a refrigeration apparatus including a cabinet having a storage space, a door for selectively closing said space, an ice maker in said space and a through-the-door ice dispenser in a housing for delivering ice from said ice making apparatus and including a housing light, an ice dispenser selecting apparatus comprising:

electrically operable means associated with said ice dispenser for selectively operating said ice dispenser to deliver either ice cubes or crushed ice;

a first selector switch in said housing including an electrical contact connected to said electrically operable means for selecting ice cubes or crushed ice;

a second selector switch in said housing including an electrical contact connected to said light for selecting operation of the same; and a switch actuator including a base mounted in said housing adjacent said switches and a pair of slides movably mounted relative to said base each for actuating one of said selector switches and including user engageable means remotely located relative to its associated said selector switch for moving said slide to actuate said selector switch.

7. The ice dispensing apparatus of claim 6 wherein said base comprises a frame including a channel receiving runners extending outwardly from each said slide.

8. The ice dispensing apparatus of claim 7 wherein each said slide comprises a generally flat plate including a pair of planar runners at a top and bottom thereof receivable in top and bottom tracks in said frame.

9. The ice dispensing apparatus of claim 8 wherein each said slide further comprises a tang at each of the top and the bottom of said plate and receivable in said tracks for providing a snug fit between said slide and said tracks.

10. The ice dispensing apparatus of claim 9 wherein said tangs and said runners are of a thickness less than a thickness of said plate and said tangs and said runners are in different planes.

11. The ice dispensing apparatus of claim 10 wherein said different planes are parallel to one another with said tangs and said runners partially overlapping.

12. The ice dispensing apparatus of claim 6 wherein each said slide and said base are of molded plastic construction.

13. The ice dispensing apparatus of claim 12 wherein said slides and said base are molded with a lubricant to facilitate movement.

14. The ice dispensing apparatus of claim 6 wherein said base includes means for limiting movement of each of said slides.

15. The ice dispensing apparatus of claim 14 wherein said limiting means limits movement by each said slide by a different amount.

* * * * *